(12) United States Patent
Weaver et al.

(10) Patent No.: US 7,610,930 B2
(45) Date of Patent: Nov. 3, 2009

(54) DISCHARGE VALVE FOR DOWNHOLE PUMPS

(76) Inventors: Tommy W. Weaver, P.O. Box 30062, Edmond, OK (US) 73003-0002; Sydney E. Pogue, 1609 Two Bridge Dr., Oklahoma City, OK (US) 73131

( * ) Notice: Subject to any disclaimer, the term of this patent is extended or adjusted under 35 U.S.C. 154(b) by 0 days.

(21) Appl. No.: 12/024,218

(22) Filed: Feb. 1, 2008

(65) Prior Publication Data
US 2009/0194729 A1   Aug. 6, 2009

(51) Int. Cl.
*F16K 15/04* (2006.01)
(52) U.S. Cl. .................. 137/533.11; 417/554
(58) Field of Classification Search ............ 137/533.11, 137/533.15, 513.3, 519.5, 515, 848, 516.11; 417/546, 554
See application file for complete search history.

(56) References Cited

U.S. PATENT DOCUMENTS 619,705 A * 2/1899 Knupp .................. 417/549
3,765,482 A * 10/1973 Harrison .................. 166/106
6,746,222 B2 6/2004 Skillman

* cited by examiner

*Primary Examiner*—John Rivell
*Assistant Examiner*—Macade Brown
(74) *Attorney, Agent, or Firm*—Dunlap Codding, P.C.

(57) ABSTRACT

A discharge valve comprising a valve body, a valve member, and a valve seat. The valve body has a first end; a second end; a central axis therebetween; an inlet formed through the first end; a flow channel extending from the inlet to the second end; a valve channel extending from the inlet and terminating within the valve body; and at least one discharge port extending from the valve channel to an outer surface of the valve body. The valve member is substantially-spherical and movably disposed within the valve channel. The valve seat is disposed adjacent the first end of the valve channel. The valve seat has an orifice defined therethrough The valve member is movable between a first position, engaging the valve seat to substantially seal the orifice, and a second position adjacent the second end of the valve channel to permit fluid to flow through the orifice.

13 Claims, 5 Drawing Sheets

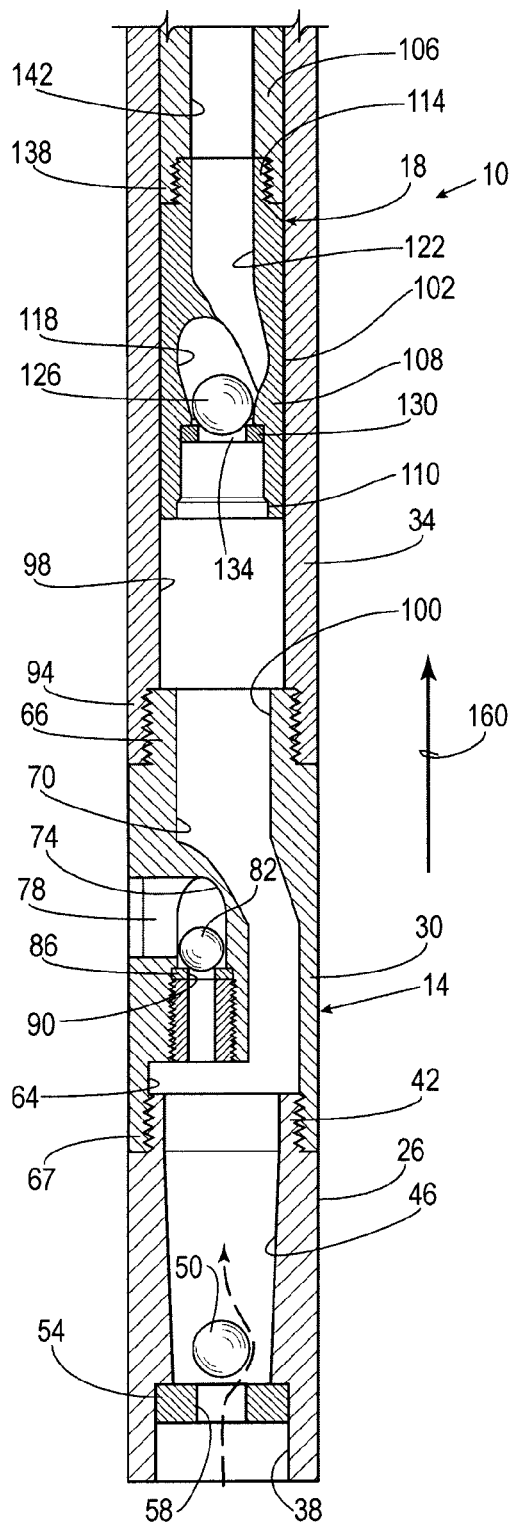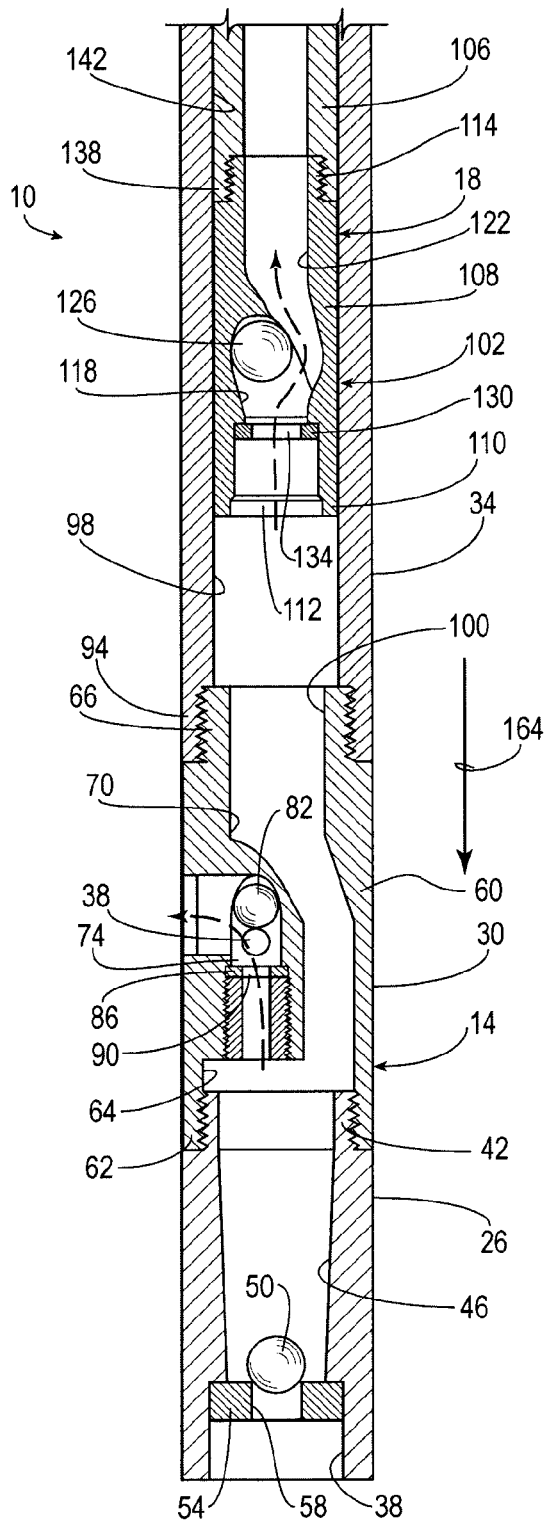
*Fig. 1*  *Fig. 2*

DISCHARGE VALVE FOR DOWNHOLE PUMPS

BACKGROUND OF THE INVENTION

1. Field of the Invention

The present invention relates generally to downhole pumping of fluids, and more particularly, but not by way of limitation, to an improved discharge valve suitable for use, for example, in a downhole petroleum pumping apparatus.

2. Brief Description of Related Art

Downhole pumps are often used to extract petroleum fluids, such as oil and/or natural gas, from subterranean formations when the natural pressure of an oil or gas formation is insufficient to lift or push the petroleum to the surface. One type of pump is known as a sucker rod pump. Such a sucker rod pump generally includes at least a pump barrel, a plunger that travels up and down within the barrel, a sucker rod actuating the plunger, a standing valve positioned at or near a lower end of the barrel, and a traveling valve positioned at or near the end of the plunger so as to travel up and down with the plunger.

A pump chamber is generally formed inside the pump barrel between the standing valve and the traveling valve. The standing valve allows fluid to flow into the chamber, but does not allow fluid to flow out of the chamber. The traveling valve allows fluid to flow out of the chamber, but does not allow fluid to flow into the chamber.

Fluid pumped by a sucker rod pump is preferably substantially all liquid. The plunger is mechanically actuated, for example, by a pumpjack, to move up and down in a reciprocating motion. On the upstroke of the pumping cycle, as the plunger moves from the bottom to the top of a stroke, the hydrostatic pressure of the liquid above the traveling valve forces the traveling valve to close. The upward motion of the traveling valve also causes a negative pressure gradient between the pump chamber and the well bore, across the standing valve. The negative pressure gradient causes the standing valve to open, drawing liquid into the pump chamber.

At the end of the upstroke, the pump chamber is filled with liquid from the formation. When the plunger begins a subsequent downstroke, i.e., moves from the top to the bottom of a stroke, the pressure in the pump chamber is increased, creating a positive pressure gradient from the pump chamber to the pump barrel, which may also be considered a negative pressure gradient across the traveling valve. This pressure gradient causes the traveling valve to open and forces the liquid in the pump chamber to flow through the traveling valve and into the pump jacket. Once the liquid is above the traveling valve and pump barrel, the liquid is forced to the surface by the plunger as the traveling valve is closed during subsequent upstrokes.

One significant drawback to such a sucker rod pump is that the plunger is forced to directly lift the liquid to the surface. Thus, the plunger must support what is generally a very tall column of liquid. This liquid column puts tremendous tensile stress on the sucker rod and can lead to wear and ultimate failure of sucker rods, plungers, and other valve components. To this end, a need exists for downhole pumps and pump components to facilitate extraction of fluids, and especially liquids, from subterranean formations to the surface, while minimizing the forces on pump components.

BRIEF DESCRIPTION OF THE SEVERAL VIEWS OF THE DRAWINGS

FIG. 1 is a cross-sectional view of one embodiment of a downhole pump, illustrated during a downstroke, and constructed in accordance with the present invention.

FIG. 2 is a cross-sectional view of the downhole pump of FIG. 1, illustrated during an upstroke.

DETAILED DESCRIPTION OF EXEMPLARY EMBODIMENTS

Figure 3:
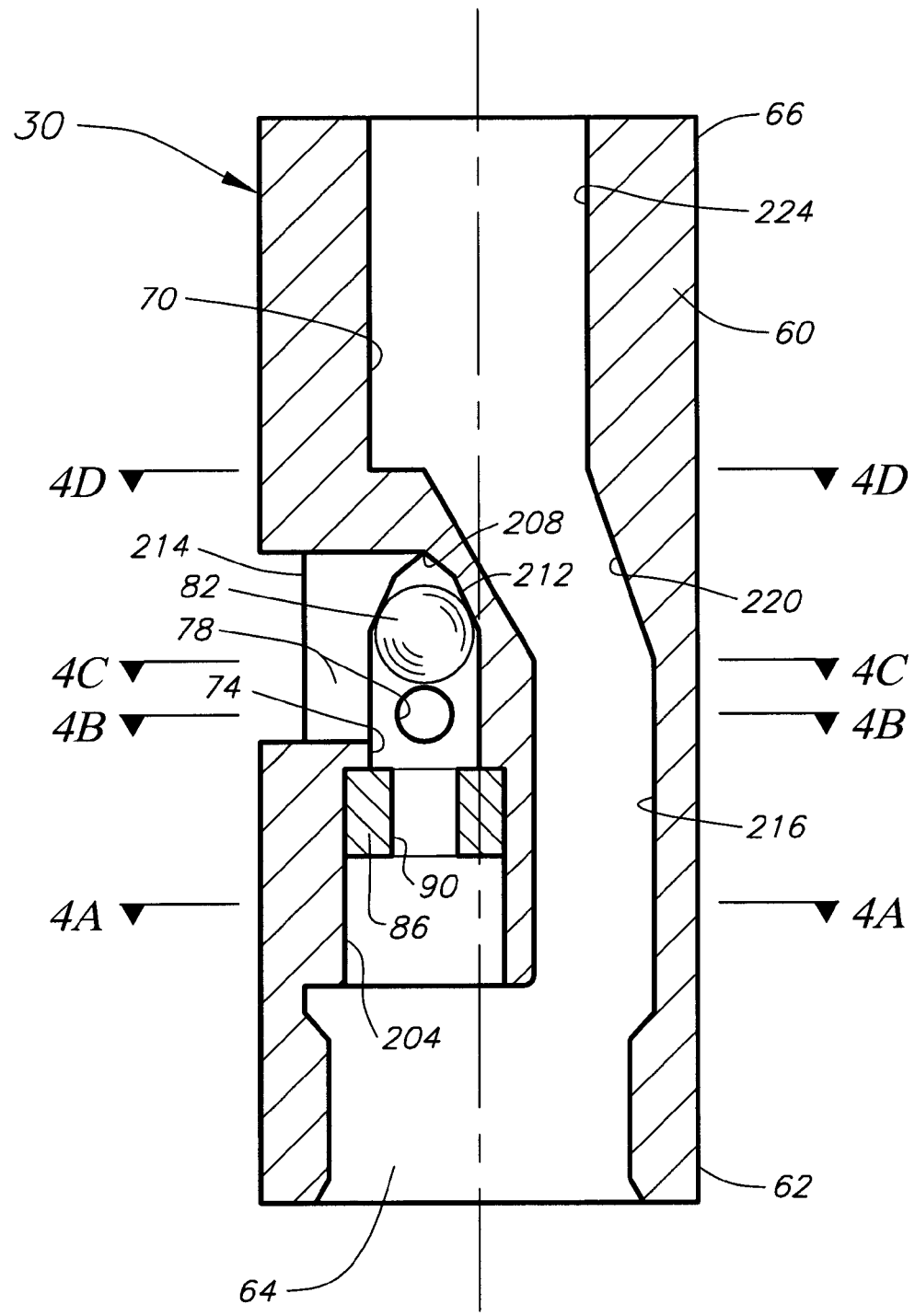
FIG. 3 is a cross-sectional view of a discharge valve constructed in accordance with the present invention, and suitable for use with downhole pump of FIGS. 1 and 2.

Referring now to the drawings, and more particularly to FIGS. 1 and 2, one embodiment of the downhole pump 10 is shown constructed in accordance with the present invention. It should be noted that the downhole pump 10 may also be described herein as a put pump 10, or simply a pump 10. The pump 10 is secured in a tubing (not shown) and used with a pump jack unit (not shown) for elevating fluids, such as hydrocarbons, to the earth's surface. In the preferred embodiment, the pump 10 includes a body assembly 14, a plunger assembly 18 slidably disposed within the body assembly 14 and mechanically actuated by a sucker rod string (not shown).

The body assembly 14 preferably includes, in sequence, a standing valve 26, a discharge valve 30, and a pump barrel 34. The standing valve 26 is preferably cylindrical and is formed with a first end 38, a second end 42 adapted to securely engage the discharge valve 30, and a channel 46 extending between the first end 38 and the second end 42. The standing valve 26 further includes a preferably spherical valve member 50 sized to fit within the channel 46, and a valve seat 54 securely disposed within a portion of the channel 46, so as to prevent the valve member 50 from passing through the first end 38 of the standing valve 26. The valve seat 54 is provided with an aperture 58 formed such that when the valve member 50 engages, and seats on, the valve seat 54, the aperture 58 is substantially sealed by the valve member 50 (FIG. 2). Conversely, when the valve member 50 is disposed away from the valve seat 54, fluid is permitted to flow through the aperture 58 of the valve seat 54 (FIG. 1), and into the channel 46.

The standing valve 26 depicted is only one example of a standing valve 26 which may be utilized with the pump 10 of the present invention. Thus, valves with similar function may be substituted and interchanged with the standing valve 26 so long as the substituted valve is suitable to permit functioning of the pump 10. More specifically, when there is a negative pressure gradient from the channel 46 across the valve seat 54, the valve member 50 moves away from the valve seat 54 such that fluids may flow through the aperture 58 of the valve seat 54 to bypass the valve member 50 and flow through the standing valve 26.

The discharge valve 30 is provided with a preferably cylindrical valve body 60 sized to correspond to the standing valve 26. The valve body 60 is formed with a first end 62 having an inlet 64 formed therethrough, a second end 66 adapted to securely engage the pump barrel 34, and a flow channel 70 in fluid communication with the inlet 64 and extending to the second end 66. The first end 62 of the discharge valve 30 securely engages the second end 42 of the standing valve 26, preferably via corresponding threads. In other embodiments, the first end 62 of the discharge valve 30 and the second end 42 of the standing valve 26 may be connected by any suitable means, for example, corresponding tabs and slots, welds, adhesives, press-fitting, or the like.

The valve body 60 is further formed with a valve channel 74 in fluid communication with the inlet 64; and with one or more discharge ports 78 extending, preferably laterally, from the valve channel 74 to an outer surface of the discharge valve 30. The discharge valve 30 is further provided with a preferably spherical valve member 82 sized to fit within the valve channel 74, and a valve seat 86 securely engaging a portion of the valve body 60, so as to prevent the valve member 82 from escaping the valve channel 74. The valve seat 86 is provided with an aperture 90 formed such that when the valve member 82 engages, and seats on, the valve seat 86 (FIG. 1), the aperture 90 is substantially sealed by the valve member 82. Conversely, when the valve member 82 is disposed away from the valve seat 86 towards the opposite end of the valve channel 74 (FIG. 2), fluid is permitted to flow through the aperture 90 of the valve seat 86 and out the discharge ports 78.

The pump barrel 34 is preferably formed with a cylindrical shape sized to correspond to the discharge valve 30. The pump barrel 34 is formed with a first end 94 adapted to securely engage the second end 66 of the discharge valve 30, a second end (not shown), and a plunger channel 98 extending between the first end 94 and the second end (not shown), and sized to slidably receive the plunger assembly 18. The first end 94 of the pump barrel 34 is adapted to securely engage the second end 66 of the discharge valve 30, preferably via corresponding threads. In other embodiments, the first end 94 of the pump barrel 34 and the second end 66 of the discharge valve 30 may be connected by any suitable means, for example, corresponding tabs and slots, welds, adhesives, press-fitting, or the like. As shown, when the standing valve 26, discharge valve 30, and pump barrel 34 are securely joined or connected to form the body assembly 14; the channel 46 of the standing valve 26, the flow channel 70 of the discharge valve 30, and the plunger channel 98 of the pump barrel 34 cooperate to define a pump chamber 100, between the valve seat 58 of the standing valve 26 and the plunger assembly 18.

The plunger assembly 18 preferably includes a traveling valve 102 and a plunger body 106. The traveling valve 102, which may also be referred to herein as a bypass valve 102 due to its novel construction, described below with reference to FIGS. 5 and 6A-6F; is provided with a preferably cylindrical valve body 108 sized to fit closely within the plunger channel 98 of the pump barrel 34. The valve body 108 of the traveling valve 102 is further formed with a first end 110 having an inlet 112 formed therethrough, a second end 114 adapted to securely engage the plunger body 106, a valve channel 118 extending inward from the inlet 112 and terminating within the valve body 108, and an outlet channel 122 extending from the valve channel 118 and/or the inlet 112 to the second end 114. The bypass valve 102 is further provide with a preferably spherical valve member 126 sized to fit within the valve channel 118, and a valve seat 130 securely engaging a portion of the valve body 108 to prevent the valve member 126 from passing through the first end 110 of the valve body 108. The valve seat 130 is provided with an aperture 134 formed such that when the valve member 126 engages, and seats on, the valve seat 130 (FIG. 1), the aperture 134 is substantially sealed by the valve member 126. Conversely, when the valve member 126 is disposed away from the valve seat 130 towards the opposite end of the valve channel 118 (FIG. 2), fluid is permitted to flow through the aperture 134 of the valve seat 130, past the valve member 126, and through the outlet channel 122, to exit the valve body 108.

The bypass valve 102 depicted is only one example of a traveling valve 102 which may be utilized with the pump 10 of the present invention. In other embodiments, the traveling valve 102 may be omitted from the pump 10 or other embodiments of the traveling valve 102 may be utilized that perform the essential function of the bypass valve 102 herein described. More specifically, when there is a negative pressure gradient from the outlet channel 122 across the valve seat 130, the valve member 126 moves away from the valve seat 130 such that fluids may flow through the aperture 134 of the valve seat 130 to bypass the valve member 126 and flow through the traveling valve 102. Thus, valves with similar function may be substituted and interchanged with the traveling valve 102, so long as the substituted valve is suitable to permit functioning of the pump 10. For example, the traveling valve 102 depicted may be sized to function as the standing valve 26, and the standing valve 26 depicted may be sized or otherwise adapted to function as the traveling valve 102.

The plunger body 106 is formed with a cylindrical shape sized to correspond with the traveling valve 102. The plunger body 106 is further formed with a first end 138 adapted to securely engage the traveling valve 102, a second end (not shown), and a fluid passage 142 extending from the first end 138 towards the second end (not shown). The first end 138 of the plunger body 106 preferably connects to the second end 114 of the traveling valve 102 via corresponding threads. In other embodiments, the first end 138 of the plunger body 106 and the second end 114 of the traveling valve 102 may be connected by any suitable means, for example, corresponding tabs and slots, welds, adhesives, press-fitting, or the like. The fluid passage 142 provides a flow path for fluids to flow from the first end 138 toward the second end (not shown) of the plunger body 106.

Various embodiments of the plunger body 106 may be implemented with the pump 10 of the present invention. For example, in one preferred embodiment, the second end (not shown) of the plunger body 106 is provided with a plurality of fluid ports or valves (not shown), such that the liquid or other fluid is ejected from within fluid passage 142, through the plunger body 106, past the pump barrel 34, and into the tubing (not shown) to be intermingled with the fluids ejected from discharge valve 30. In other embodiments, the second end (not shown) of the plunger body 106 may be adapted to connect to a hollow sucker rod (not shown), such that a portion of the fluid may be lifted or forced to the surface within the hollow sucker rod (not shown). Various valves, hollow sucker rods, and the like are well known in the art, and no further description thereof is deemed necessary for one skilled in the art to implement the two exemplary embodiments of the plunger body 102, or the various other embodiments of the plunger body 102 which may be utilized with the present invention.

In operation, the pump 10 function as follows. As best shown in FIG. 2, the plunger assembly 18 is mechanically actuated in an upward, direction 160, which may also be referred to as an upstroke. As the plunger assembly 18 moves in the upward direction 160, the valve member 126 of the bypass valve 102 is forced downward into a first position adjacent to the valve seat 130 to seal the aperture 134 by gravity and/or hydrostatic pressure of fluid within the outlet channel 122 of the bypass valve 102 and/or within the fluid passage 142 of the plunger body 106. Thus, the motion of the plunger assembly 14 in the first direction 160 causes a negative pressure gradient across the at least one discharge port 78 of the discharge valve 30 and across the aperture 58 of the standing valve 26. This negative pressure gradient draws the valve member 82 of the discharge valve 30 into a first position engaging the valve seat 86 to close the discharge valve 30; and draws the valve member 50 of the standing valve 26 away from the valve seat 54 to open the standing valve 26 and permit fluid to be drawn through the aperture 58 of the standing valve 26 and into the valve chamber 100.

Once the plunger assembly 14 reaches the apex of the upstroke, and as best shown in FIG. 2, the plunger assembly 14 is mechanically actuated in a downward direction 164, which may also be referred to as a downstroke. As the plunger assembly 18 moves in the downward direction 164, the valve member 126 of the bypass valve 102 is forced upward into a second position away from the valve seat 130 to open the aperture 134, by the pressure of the fluid within the valve chamber 100. More specifically, the downstroke creates a negative pressure gradient across the bypass valve 102, in that the pressure within the bypass valve 102 is less than the pressure on the outer side of the inlet 112 of the bypass valve 102. Thus, the motion of the plunger assembly 14 in the second direction 164 causes a positive pressure gradient across the at least one discharge port 78 of the discharge valve 30 and across the aperture 58 of the standing valve 26. These pressure gradients push the valve member 82 of the discharge valve 30 into a second position away from the valve seat 86 to open the discharge valve 30; and pushes the valve member 50 of the standing valve 26 to engage the valve seat 54 to close the standing valve 26, and thereby push fluid out of the valve chamber 100 through the apertures 90 and 134 of the discharge valve 30 and the bypass valve 102, respectively.

As fluid is pushed out of the valve chamber 100, through the at least one discharge port 78 of the discharge valve 30, and into the tubing (not shown), the increasing volume of fluid within the tubing (not shown) causes the fluid within the tubing (not shown) to rise toward the surface. Simultaneously, the fluid forced through the bypass valve 102 is forced into the fluid passage 142 of the plunger body 106. Although various embodiments of the valves 30 and 102 may result in differing distributions of fluid, in the preferred embodiment shown, between about 30% and about 50% of the fluid ejected from the valve chamber 100 is ejected through the discharge valve 30, and the remaining portion is ejected from the valve chamber 100 through the bypass valve 102.

In one preferred embodiment, the second end (not shown) of the plunger body 106 is provided with one or more of fluid ports and/or valves (not shown), such that the liquid or other fluid is ejected from within fluid passage 142, through the plunger body 106, past the pump barrel 34, and into the tubing (not shown) to be intermingled with the fluids ejected from discharge valve 30. Thus, the fluid passing through the bypass valve 102 further adds to the volume of fluid within the tubing (not shown) to further raise the level of fluid within the tubing and thereby cause the fluid to rise to the surface, where it can be extracted from the well. As will be appreciated by those skilled in the art, this permits fluid to be extracted from the well without requiring the sucker rod to support the weight of a fluid column, such as in other types of pumps which mechanically lift the fluid to the surface with the plunger.

In other embodiments, the second end (not shown) of the plunger body 106 may be adapted to connect to a hollow sucker rod string (not shown), such that a portion of the fluid may be lifted to the surface within the hollow sucker rod string (not shown). In this embodiment, the use of the discharge valve 30 is advantageous in that only a portion of the fluid is mechanically lifted by the hollow sucker rod string (not shown), such that the wear on the various valve components is reduced. Various valves for ejected fluid from the plunger body 106, hollow sucker rods, and the like are well known in the art, and no further description thereof is deemed necessary for one skilled in the art to implement the two exemplary embodiments of the plunger body 106, or the various other embodiments of the plunger body 106 which may be utilized with the present invention.

As will be appreciated by those skilled in the art, once the plunger assembly 14 reaches the end of the downstroke, the plunger assembly 14 is once again reversed and mechanically actuated in the upward direction 160 for a subsequent upstroke, wherein alternating upstrokes and downstrokes, respectively, may be sequentially repeated to extract fluid from a well.

Referring now to FIGS. 3 and 4A-4D, enlarged cross-sectional views of the discharge valve 30 are depicted to facilitate a more complete description and understanding of the novel features and function of the discharge valve 30. As described above with reference to FIGS. 1 and 2, the discharge valve 30 includes a valve body 60 formed with a first end 62 having an inlet 64 formed therethrough, a second end 66, and a flow channel 70 extending from the inlet 64 to the second end 66. The first and second ends 62 and 66 may be provided with any suitable shape or size for engaging and/or connecting to adjacent parts, for example, the standing valve 26 (FIGS. 1 and 2), or the pump barrel 34 (FIGS. 1 and 2). As also described above with reference to FIGS. 1 and 2, the valve body 60 of the discharge valve is further provided with a valve channel 74 extending from the inlet 64 toward the second end 66, and terminating within the valve body 60. The valve body 60 is further formed with at least one discharge port 78, and more preferably multiple discharge ports 78, extending from the valve channel 74 to an outer surface of the valve body 60.

The discharge valve 30 is further provided with a valve member 82 and a valve seat 86. The valve member 82 is preferably spherical and is sized to be movably received in the valve channel 74. The valve seat 86 is preferably sized to fit within, and securely engage, a portion of the valve channel 74 so as to retain the valve member 82 within the channel. The valve seat 86 is formed with an aperture 90 therethrough, and the valve seat 86 is adapted to be engaged by the valve member 82 such that when the valve member 82 engages, and thereby seats on, the valve seat 86, the aperture 90 is substantially sealed by the valve member 82.

As shown, a central axis 200 may, for reference, be defined extending preferably through the respective centers of the first and second ends 62 and 66 of the valve body 60. Preferably, at least a portion of each of the flow channel 70 and valve channel 74 is substantially parallel to the central axis 200. Preferably, both channels 70 and 74 are also at least partially offset from the central axis 200, as shown.

In the preferred embodiment, the valve channel 74 is provided with a first end 204 and a second end 208. The first end 204 is preferably in fluid communication with the inlet 64 of the valve body 60. The second end 208 is preferably provided with a conical portion 212, as shown, so as to minimize the surface area of the valve member 82 contacted when the valve member 82 is adjacent to the second end 208 of the valve channel 74, thereby reducing the likelihood of vapor lock or the like preventing the valve member 82 from freely moving within the valve channel 74. In the preferred embodiment, the conical portion 212 is tangent to a spherically-rounded second end 208. As described above in general terms, the valve member 82 is disposed within the valve channel 74 such that the valve member 82 is freely movable between a first position (FIG. 1) closing the discharge valve 30 and a second position (FIG. 2) opening the discharge valve 30. When the valve member 82 is disposed in the first position, the valve member 82 engages the valve seat 86 so as to substantially seal the aperture 90 through the valve seat 86. When the valve member 82 is disposed in the second position, the valve member 82 engages the conical portion 212 of the valve channel 74 so as to permit fluid to flow through the aperture 90 of the valve seat 86 and out the discharge ports 78.

Figure 4C:
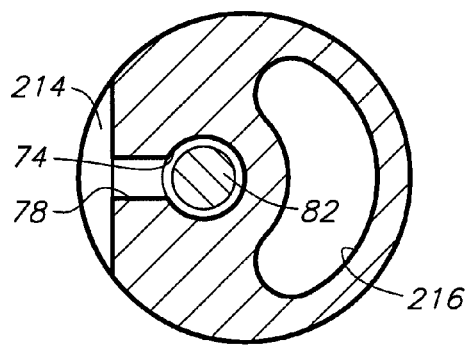
FIGS. 4A-4D are cross-sectional views of the discharge valve of FIG. 3.
Figure 4D:
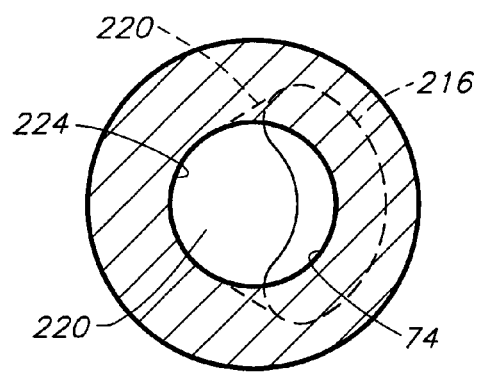
Figure 4A:
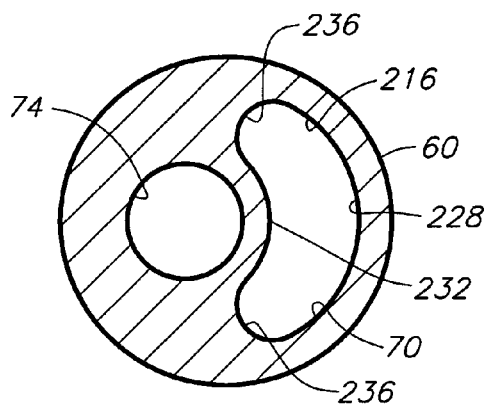
Figure 4B:
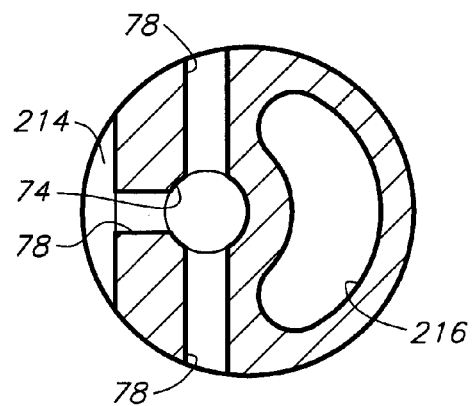

As best shown in FIG. 4A, the first end 204 of the valve channel 74 is preferably enlarged to selectively receive the valve seat 86, and adapted to securely engage the valve seat 86, for example, with threads, interlocking tabs and slots, press fitting, or the like. As discussed above, and best shown in FIG. 4B, the valve body 60 is further provided with at least one, and preferably a plurality of, discharge ports 78 extending from the valve channel 74 to an external surface of the valve body 60. The discharge ports 78 may be provided in any suitable shape, size, or number, so as to permit fluids to be discharged from the valve channel 74 out of the valve body 60. In one embodiment, the valve body 60 is provided with three discharge ports 78, and more specifically, one central, elongated discharge port 78 extending the shortest distance outward from the valve channel 74, and two circular discharge ports 78 extending laterally outward from the valve channel 74 substantially perpendicular to the central, elongated discharge port 78. The preferred plurality of discharge ports 78 distributes the fluid flow out of the discharge valve 30 so as to prevent the fluid, and solid particulates therewithin, from eroding or otherwise damaging the tubing (not shown). Similarly, near the outer portion of the central, elongated discharge port 78, the valve body 60 is provided with a flattened portion 214 to permit fluid to fan out laterally as it exits the central, elongated discharge port 78 to further reduce the likelihood that fluid, and solid particulates therewithin, will erode or otherwise damage the tubing (not shown).

In the preferred embodiment, the flow channel 70 may be described as having an inlet portion 216, a transition portion 220, and an outlet portion 224. The inlet portion 216 is preferably parallel to, and offset from, the central axis 200 and extends inward from the inlet 64 of valve body 60. The outlet portion 224 of the flow channel 70 is preferably coaxially-aligned with the central axis 200 and extends inward from the second end 66 of the valve body 60, in the general direction of the second end 208 of the valve channel 74. The transition portion 220 of the flow channel 70 transitions between the different cross-sections and alignments of the inlet and outlet portions 216 and 224 of the flow channel 70 so as to provide a relatively smooth transition therebetween to improve the flow characteristics and capacity of the flow channel 70.

As best shown in FIG. 4A, the inlet portion 216 of the flow channel 70 is preferably formed with a generally reniform or kidney-shaped cross-section. This reniform cross-section may be more particularly described as having an outer arcuate portion 228, and inner arcuate portion 232, and two lateral arcuate portions 236 joining the inner and outer arcuate portions 228 and 232. The outer arcuate portion 228 is preferably offset a constant distance from the outer surface of the valve body 60, such that the outer arcuate portion 228 is radially defined about the central axis 200. The inner arcuate portion 232 is preferably offset a known distance from the valve channel 74 such that inner arcuate portion 232 is radially-defined about a central axis of the valve channel 74.

As best shown in FIG. 4D, the outlet portion 224 of the flow channel 70 is preferably formed with a circular cross-section coaxially aligned with the central axis 200. As also shown in FIG. 4D, the transition portion 220 of the flow channel 70 provides a preferably smooth transition from reniform cross-section and offset alignment of the inlet portion 216 and the circular cross-section and coaxial alignment of the outlet portion 224 of the flow channel 70.

Referring now to FIGS. 5 and 6A-6F, enlarged cross-sectional views of the bypass valve 102 are depicted to facilitate a more complete description and understanding the novel features and functions of the bypass valve 102. As described above, the bypass valve 102 is provided with a valve body 108 formed with a first end 110 having an inlet 112 formed therethrough, a second end 114, a valve channel 118 in fluid communication with the inlet 112 and extending inward to terminate within the valve body 108, and an outlet channel 122 in fluid communication with the valve channel 118 and/or the inlet 112 and preferably extending to the second end 114 of the valve body 108.

In the preferred embodiment, the valve body 102 may be described as having a central axis 250 extending preferably between the centers of the first and second ends 110 and 114, respectively, of the valve body 108. The valve channel 118 is formed with a first end 254, a second end 258, and a central channel axis 262 therebetween. The valve channel 118 is preferably formed with a circular cross-section defined about the channel axis 262. In other embodiments, the valve channel 118 may be formed with any suitable cross-section to enable the function described herein. As shown, the channel axis 262 is angularly disposed from the central axis 250 by an angle 266. The angle 266 preferably ranges from about 10 degrees to about 20 degrees, and more preferably is between about 14 degrees and about 16 degrees, inclusive.

It is preferable to optimize the angle 266 so as to optimize the length of the channel axis 262, i.e., the distance from the first end 254 to the second end 258 of the valve channel 118. More specifically, the longer the valve channel 118, the greater velocity the valve member 126 will strike the conical portion 270 with when the bypass valve 102 opens. Such increased velocity increases wear and erosion on the conical portion 270 and on the valve member 126, effectively reducing the service life of the valve. However, if the length of the valve channel 118 is too short, the valve member 126 may not be permitted to move far enough laterally to permit fluid to flow at sufficient rates around the valve member 126 and through the outlet channel 122. Thus, the angle 266 and the length of valve channel 118 must be optimized to reduce wear and extend service life, as well as to maximize flow characteristics of the bypass valve 102. In one embodiment, the length of the valve channel 118 may be expressed in terms of the diameter of a spherical valve member 126. In the preferred embodiment, the length of the valve channel 118 is preferably between about 1.5 and about 2 times the diameter of a spherical valve member 126, and more preferably between about 1.65 and about 1.85 times the diameter of the spherical valve member 126.

The valve channel 118 is also preferably formed with a conical portion 270, as shown, so as to minimize the surface area of the of the valve member 126 contacted when the valve member 126 is adjacent to the second end 258 of the valve channel 118, thereby reducing the likelihood of vapor lock or the like preventing the valve member 126 from freely moving within the valve channel 118. In the preferred embodiment, the conical portion 270 is tangent to the spherically-rounded second end 258. As described above in general terms, the valve member 126 is disposed within the valve channel 118 such that the valve member 126 is freely movable between a first position (FIG. 1) closing the bypass valve 102 and a second position (FIG. 2) opening the bypass valve 102. When the valve member 126 is disposed in the first position, the valve member 126 engages the valve seat 130 so as to substantially seal the aperture 134 through the valve seat 130. When the valve member 126 is disposed in the second position, the valve member 126 engages the conical portion 270 of the valve channel 118 so as to permit fluids and solids to flow through the aperture 134 of the valve seat 130 and out the outlet channel 122 of the valve body 108.

Figure 5:
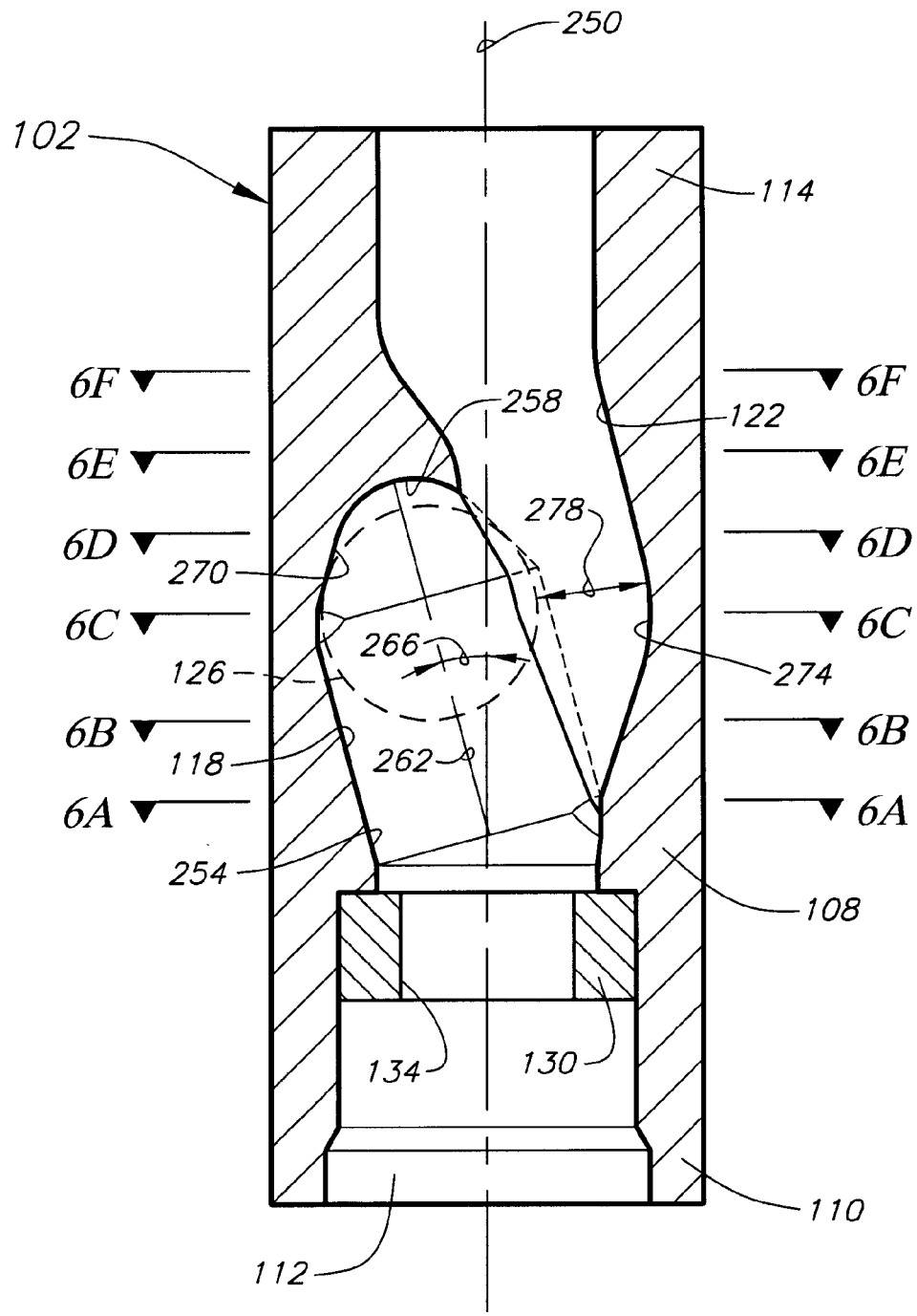
FIG. 5 is a cross-sectional view of one embodiment of a bypass valve constructed in accordance with the present invention, and suitable for use with the downhole pump of FIGS. 1 and 2.
Figure 6E:
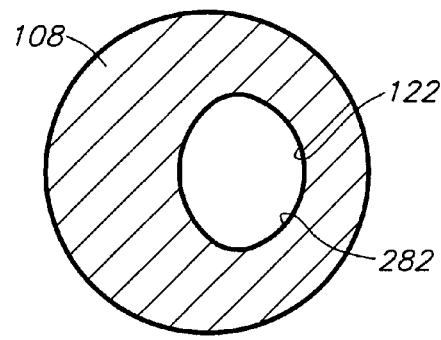
FIGS. 6A-6F are cross section views of the bypass valve of FIG. 5.
Figure 6F:
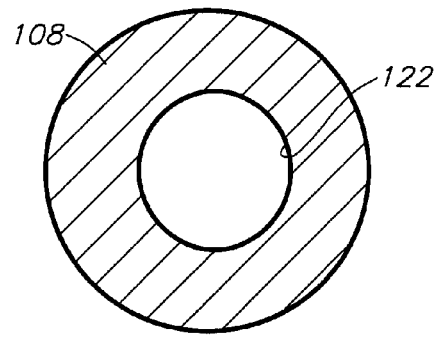
Figure 6C:
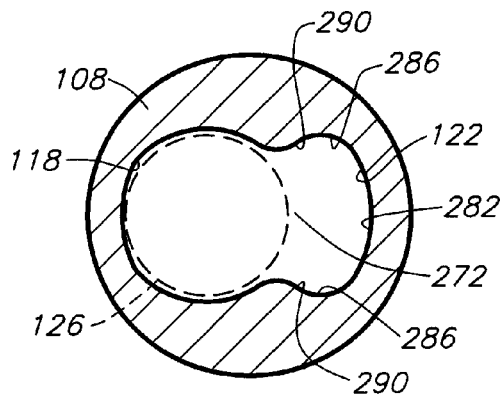
Figure 6D:
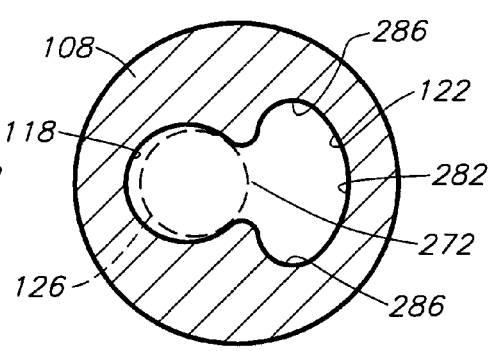
Figure 6A:
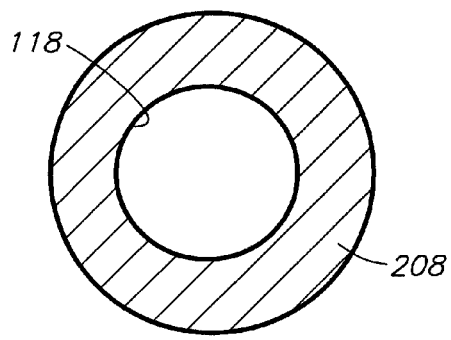
Figure 6B:
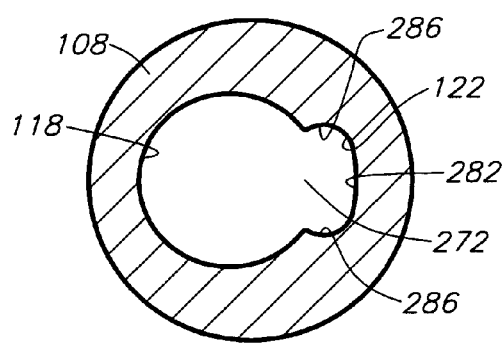

More specifically, the valve body 108 is provided with an opening 272 between the valve channel 118 and the outlet channel 122. The opening 272 is sized to preferably maximize fluid communication between valve channel 118 and the outlet channel 122, while also preventing the valve member 126 from passing from the valve channel 118 to the outlet channel 122, as shown. As best shown in FIG. 5 the outlet channel 122 is preferably formed with an arcuate portion 274 offset a distance 278 from the valve member 126 when the valve member 126 is in the second position adjacent to the second end 258 of the valve channel 118. As best shown in FIGS. 6B, 6C, and 6D, the cross-section of the outlet channel 122 is preferably formed with an outer arcuate portion 282, a pair of lateral arcuate portions 286, and, as best shown in FIG. 6C (which is substantially perpendicular to the flow path of the outlet channel 122), a pair of substantially straight lateral wall portions 290; all of which cooperate to define an at least partially reniform, or kidney-shaped, cross-sectional flow area.

As will be appreciated by those skilled in the art, the geometry of the bypass valve 102 described above obtains improved flow characteristics by channeling fluids and some solids through a single, preferably smooth, enlarged outlet channel 122. As best shown in FIG. 5, the angular disposition of the valve channel 118 relative to the outlet channel 122, causes the valve member 126 to move laterally and axially away from the valve seat 130, permitting the outlet channel 122 to direct fluid smoothly around the valve member 126 in a single flow path with minimal turbulence-induction. Such geometry is preferably achieved by forming the valve body 102 with known casting methods, as such casting methods have proven to permit easier formation of the particularly novel geometry of the valve body 108 described above. More particularly, such casting methods better enable the formation of increased angles 266 between the channel axis 262 of the valve channel 118 and the central axis 250 of the valve body 108; the shortened length of the valve channel 118; and the substantially straight wall portions 290. However, in other embodiments, the geometry of the valve body 102 may be achieved by any known methods, such as, for example, machining, forging, or the like.

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed.

What is claimed is:

1. A discharge valve comprising:
a one-piece cylindrical valve body having a first end, a second end, and a central axis therebetween, the valve body further having an inlet, a single flow channel, a valve channel, and at least one discharge port, the inlet formed through the first end of the valve body, the single flow channel in fluid communication with the inlet and extending from the inlet to the second end of the valve body, the valve channel and at least a portion of the single flow channel offset from the central axis of the valve body, the valve channel having a first end in fluid communication with the single flow channel, and a second end disposed within the valve body, the at least one discharge port extending from the valve channel to an exterior surface of the valve body;
a substantially-spherical valve member disposed within the valve channel of the valve body, the valve member sized to be movable within the valve channel while being prevented from passing through the at least one discharge port; and,
a valve seat disposed within the valve body and adjacent to the first end of the valve channel, the valve seat having an orifice defined therethrough, the orifice sized to prevent the valve member from passing therethrough; and,
wherein the valve member is movable between a first position engaging the valve seat and a second position adjacent the second end of the valve channel, and wherein the valve member in the first position substantially seals the orifice in the valve seat so as to substantially prevent fluid from flowing out of the valve body through the at least one discharge port, and wherein the valve member in the second position permits fluid to flow out of the valve body through the at least one discharge port.

2. The discharge valve of claim 1, wherein the valve channel of the valve body has a substantially-circular cross-section.

3. The discharge valve of claim 1, wherein at least a portion of the valve channel adjacent to the second end of the valve channel is conically shaped.

4. The discharge valve of claim 3, wherein the second end of the valve channel is spherically-rounded and the conically-shaped portion of the valve channel is truncated to be substantially tangent to the spherically-rounded second end of the valve channel.

5. The discharge valve of claim 1, wherein the at least one discharge port of the valve body extends at least a majority of the length of the valve channel.

6. The discharge valve of claim 1, wherein the at least one discharge port extends outward from the valve channel along the shortest path to the exterior surface of the valve body.

7. The discharge valve of claim 1, wherein at least a portion of the exterior surface of the valve body adjacent the at least one discharge port is recessed to permit dispersion of fluid as it flows out of the at least one discharge port.

8. The discharge valve of claim 1, wherein the at least one discharge port of the valve body comprises a plurality of discharge port openings.

9. The discharge valve of claim 8, wherein the plurality of discharge port openings comprises three discharge ports.

10. The discharge valve of claim 9, wherein a first one of the three discharge port openings extends outward from the valve channel along the shortest path to the exterior surface of the valve body.

11. The discharge valve of claim 10, wherein the other two of the three discharge port openings are disposed on each side of the first discharge port openings.

12. The discharge valve of claim 11, wherein each of the other two of the three discharge port openings is angularly disposed from the first discharge port openings by about 90 degrees.

13. The discharge valve of claim 12, wherein at least a portion of the exterior surface of the valve body adjacent to at least the first of the three discharge port openings is recessed to permit dispersion of fluid as it flows out of at least the first of the three discharge port openings.

* * * * *